Figure 1:
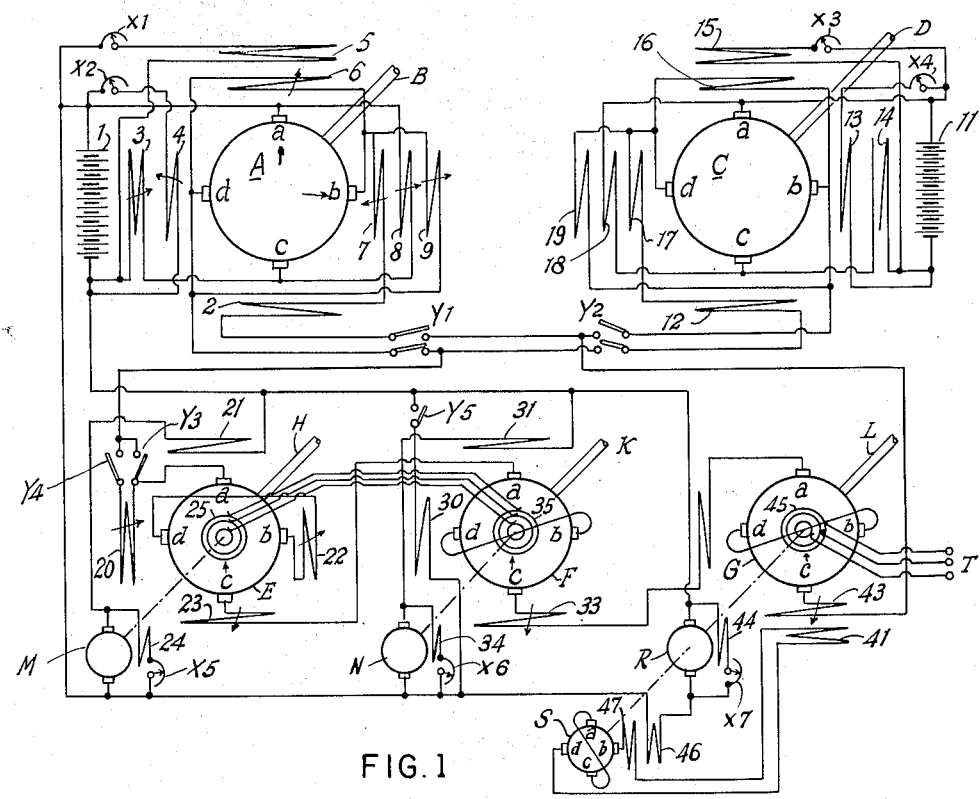

Aug. 28, 1956  J. M. PESTARINI  2,761,074

VARIABLE SPEED POWER SYSTEM

Filed May 16, 1952

INVENTOR
Joseph M. Pestarini
BY
ATTORNEY

United States Patent Office 2,761,074
Patented Aug. 28, 1956

2,761,074

VARIABLE SPEED POWER SYSTEM

Joseph M. Pestarini, Staten Island, N. Y.

Application May 16, 1952, Serial No. 288,226

10 Claims. (Cl. 307—84)

This invention relates to power systems and particularly to systems involving the use of prime movers having variable speeds.

An object of this invention is to provide improved power systems comprising a variable speed input, a constant speed output and improved electrical means for translating said input to said output.

Another object of this invention is to provide a system of the character described wherein rotatable electric machines are provided for transforming power produced by a variable speed device into power at constant speed or alternating current of constant frequency, or both.

A further object of this invention is to provide in a system of the character described including power generator means rotating at variable speed and in circuit with a plurality of rotating electric machines wherein selected groups of said machines may rotate at precisely synchronized speed while other of said machines rotate at a predetermined constant speed, the other machines being further operative to provide alternating current of constant frequency.

Yet another object of this invention is to provide in a system of the character described rotating power generating means operating over a wide range of speeds, in circuit with one or more motors, each motor operating with very little variation from a predetermined speed.

Yet a further object of this invention is to provide in a system of the character described, simple means for controlling the output of constant speed or constant electrical frequency.

Still another object of this invention is to provide in a system of the character described, an arrangement including a plurality of generators operating at different speeds wherein the outputs thereof may be combined for supply to motors operating at constant speed.

Still a further object of this invention is to provide electric generators operating at variable speed yet adapted to supply power to electric machines rotating at constant speed and to supply current at constant voltage.

Other objects of this invention will in part be obvious and in part hereinafter pointed out.

Figure 2:
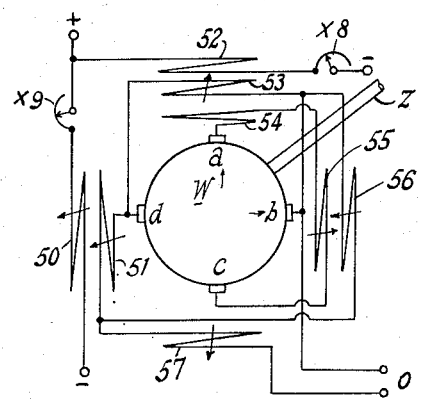

In the drawing:

Fig. 1 shows the interconnections of a power system embodying the invention; and Fig. 2 shows a generator portion thereof with modified connections.

Referring in detail to the drawing and particularly to Fig. 1, the system embodying the invention comprises a pair of similiar electric generators A and C of the metadyne type, such generators being adapted to be rotated by prime movers, not shown, which may be of variable speed, through shafts B, D, respectively.

The electrical output of generators A, C, singly or in combination, as hereinafter described, is supplied to a plurality of constant speed rotating electric machines E, F, G, which may be of the metadyne type and have output shafts H, K, L, respectively.

The armatures of generators A, C are provided with a set of primary brushes $a$, $c$ and a set of secondary brushes $b$, $d$ displaced therefrom. The generator A further includes control stator windings 2, 3, 4, 5, 6, 7, 8, and 9 wherein windings 2, 5 and 6 are arranged so that their magnetic axes coincide with the commutating axis of the primary brushes and the remaining windings are arranged so that their magnetic axes coincide with the commutating axis of the secondary brushes.

The primary brushes $a$, $c$ of generator A are connected in a low resistance circuit including a source of direct current such as battery 1. The secondary brushes $b$, $d$ are connected to an output circuit through a switch Y1.

Winding 2 is connected in circuit with the secondary brushes $b$, $d$ and is operative to induce an electromotive force which is opposed to the current inducing the same. Similarly, winding 3 is connected in circuit with the primary brushes $a$, $c$ and induces an electromotive force opposed to the current inducing the same. The windings 2, 3 stabilize the operation of the generator.

Winding 4 is energized by battery 1 through rheostat X2. Winding 5 is also energized by battery 1, through rheostat X1. Winding 6 is connected across brushes $b$, $d$ and is operative to induce an electromotive force between the brushes in a direction determined by the load. Winding 7 in circuit with the secondary brushes $b$, $d$, and adapted to provide less than 100% compensation, is operative to only partially compensate the armature ampere turns due to the secondary current of the armature.

Winding 8 is connected to the primary brushes $a$, $c$ and creates ampere turns which induce an electromotive force substantially equal to the electromotive force of the direct current source 1. Winding 9 is connected across secondary brushes $b$, $d$ and induces by its ampere turns, an electromotive force between said primary brushes $a$, $c$ in a direction determined by the primary current and the load.

The intensity and direction of the current traversing control winding 4 determines the intensity and direction of the secondary current traversing brushes $b$, $d$. Assuming that the armature winding and rotation is clockwise, that the load is positive and that the direction of the ampere turns of winding 4 is to the left as indicated by the arrow in Fig. 1, then the direction of the ampere turns of the other stator windings will be as indicated by the respective arrows in the figure, while the direction of the armature primary and secondary ampere turns will be indicated by the arrows within the circle designating the generator armature. It will be noted that the ampere turns of winding 4 are in opposition to the ampere turns of the secondary armature current.

Assuming that only winding 7 is operative, then a secondary current traversing brushes $b$, $d$ of generator A and said winding will create a flux in the direction from brush $d$ to brush $b$, as indicated by the arrow. This flux creates a counter E. M. F. between brushes $a$, $c$ in opposition to the E. M. F. of battery 1. Now, further assuming that winding 4 is also operative and creating ampere turns in the direction indicated by the arrow, another flux is created by winding 4 in a direction from brush $b$ to brush $d$, opposing the flux created by the secondary armature current and therefore, the counter E. M. F. induced between the primary brushes $a$, $c$ will be of a low value and a primary current traversing the armature from brush $a$ to brush $c$ will be supplied by battery 1.

The said primary current will in turn create a flux in a direction from brush $c$ to brush $a$ as indicated by the arrow, thereby inducing an E. M. F. between brushes $b$, $d$ of a value large enough to require the secondary current to assume a value substantially equal to that which it had before considering the action of winding 4.

As the necessary ampere turns for magnetizing the magnetic circuit of the generator is very small as compared to the full load current, the ampere turns created by the secondary current will substantially compensate the ampere turns created by winding 4. Accordingly, the secondary output current will be substantially constant independently of the secondary voltage induced between brushes b, d.

Under such conditions, the generator A supplies a constant secondary current substantially proportional to the ampere turns created by the stator winding 4, at the voltage required by the load, notwithstanding rapid variations in said voltage. This is accomplished independently of the rotational speed of shaft B on the generator. Furthermore, the operation of the system is quite stable despite sudden variations in the load due to the stabilizing action of windings 2, 3. The action of windings 5, 6 and 8 tends to keep the secondary output current of the generator at a predetermined value with minimum variation therefrom. The output of generator A is supplied to a loop circuit comprising said rotating electric machines E, F and G, as hereinafter described, upon the closing of switch Y1.

The generator C comprises control stator windings 12, 13, 14, 15, 16, 17, 18 and 19, which correspond to windings 2, 3, 4, 5, 6, 7, 8, and 9, respectively of generator A, both as to location and function. Battery 11 and rheostats X3 and X4 correspond to battery 1 and rheostats X1 and X2, respectively. The output of generator C is supplied to said loop circuit through switch Y2. It is apparent that if both switches Y1 and Y2 are closed, the generators A, C will operate in parallel and will automatically supply the same electromotive force required by the machines in the loop circuit. The ratio of the currents supplied by the generators may be determined by suitable variation of the currents in windings 4, 14, through rheostats X2, X4, respectively. Similarly, the direction and intensity of the primary currents traversing the primary brushes a, c is determined by setting the ampere turns created by the stator windings 5, 15, through rheostats X1, X3, respectively. The rotational speed of shafts B and D may be equal or different.

It is understood that the system may operate with a single generator, in which case the switch connecting the other generator to the loop circuit, is opened. It is also understood that any number of generators may be connected in parallel, each rotating at its own speed. The voltages of the direct current sources of the generators may be equal, in which a single source may be used for the several generators. Any suitable, low resistance direct current generator may be used in place of the batteries. Additionally, each generator may supply an independent loop circuit.

The rotating electric machines E, F and G, which comprise the loop circuit may be of the metadyne type, wherein the armatures have associated therewith a pair of primary brushes a, c and a pair of secondary brushes b, d, displaced therefrom. In each case, the secondary brushes b, d are essentially short circuited. The machines are series connected by way of their primary brushes to the output of the generators A, C. Such machines are intended to be energized with substantially constant current and to rotate at a desired constant speed without deviation due to load variation.

Machine E is provided with stator windings 21, 22, 23 and 24, wherein the magnetic axes of windings 20, 22 are coincident with the commutating axis of the secondary brushes and the magnetic axes of windings 21, 23 are coincident with the commutating axis of the primary brushes. Winding 20 is connected in series with brush a of the machine and is traversed by the current in the loop circuit. Winding 21 is energized by a regulator current provided by a regulator dynamo M which is coupled to the shaft H of machine E and is shunt excited by field winding 24, the excitation being regulated by rheostat X5. The brushes of dynamo M are connected to battery 1 through winding 21. The operation of a regulator dynamo is described in detail in Patent 1,962,030.

Winding 22 is connected in the secondary brush circuit and its ampere turns preferably increase the armature secondary ampere turns to a desired value. Generally, such armature ampere turns are increased when the machine is of relatively small power, but are decreased when the machine is of relatively large power. Winding 23 is series connected to primary brush c and is traversed by the current of the loop circuit and partially or completely compensates the armature ampere turns due to the primary current. As shown in Fig. 1 by the arrows, winding 23 is in opposition to the primary armature current.

The regulator dynamo M is adapted to create a current which is zero when the speed of shaft H is equal to the "critical speed" of the dynamo which is assumed to be operating under conditions of total unsaturation of the iron. However, if the speed of shaft H varies even slightly from said critical speed, the dynamo will supply a regulator current which is proportional to and directly responsive to the speed variation of the shaft. Such regulator current upon energizing winding 21, is effective to provide a torque which will keep the speed of shaft H practically constant irrespective of the load coupled to the shaft. Machines E, F and G may be of the motor metadyne type such as more completely described in application Ser. No. 698,372, filed September 20, 1946, now U. S. Patent No. 2,642,556, or application Ser. No. 707,699, filed November 4, 1946, now U. S. Patent 2,662,999.

With machine E, assuming first that only windings 21 and 23 are operative and that switch Y3 is closed while switch Y4 is open. Then, the constant current supplied by generators A and C traverses the armature of machine E from brush a to brush c and creates a primary flux in the direction indicated by the arrow. Such primary flux induces an E. M. F. between brushes b, d assuming that the machine is rotating, which will create a secondary current that will provide a secondary flux in the direction from brush d to brush b.

The secondary flux will induce between the primary brushes a, c, a counter E. M. F. and give rise to a torque. If the machine E rotates at the critical speed of dynamo M and said toque is equal to the countertorque on shaft H, no current will traverse winding 21. However, if the countertorque exceeds said torque and thus causing machine E to reduce its speed, which in turn will reduce the E. M. F. of dynamo M, then a regulator current will flow from battery 1 to said dynamo through winding 21. Such regulator current creates a flux in the same direction as the flux created by the primary current traversing the armature from brush a to brush c and will increase the E. M. F. induced between brushes b, d and thereby increase the secondary flux in the direction from brush b to brush d, giving rise to an increased torque equal to the higher countertorque and will thus restore the machine E to its original operating values except for minor deviations.

If the countertorque on shaft H is less than said torque, the speed of machine E will tend to increase and the dynamo M will supply a regulator current to the battery 1 while traversing winding 21 which will reduce the primary flux and therefore also reduce said torque to a value equalling that of said countertorque and thereby restore the machine speed to its normal value. Winding 22 is effective to stabilize the operation of machine E.

Machine F is similar to machine E in that stator windings 31, 33 correspond to windings 21, 23, respectively.

The secondary brushes b, d are directly short circuited and stator winding 30 is connected across battery 1. Winding 31 is energized by a regulator dynamo N, which is similar to dynamo M, and includes a shunt excitation winding 34, with a rheostat X6 in series therewith, the dynamo being coupled to machine F.

The windings 20 and 30 are necessary for starting the machines E and F, respectively, but may be disconnected when the machines attain a predetermined speed, by opening switches Y4, Y5, which are series connected to windings 20, 30, respectively, and by closing switch Y3 in series with brush a on machine E. During the starting period, switches Y4, Y5 are closed while switch Y3 is open. No harm will result if the windings 20, 30 are not disconnected during the running period, although the efficiency of the system will be somewhat reduced.

The value of the constant speed of machines E and F may be the same or different, such value being determined by the setting of rheostats X5 and X6. If the machines E and F are to have the same speed, the rheostats will have the same settings. However, closer synchronization of the speed of the machines may be obtained by providing the machines with polyphase slip rings 25, 35, respectively, the rings being connected to the equidistant portions of the armature windings. The corresponding brushes on the sets of slip rings are interconnected as shown in Fig. 1, to provide parallel connections.

Machine G has its secondary brushes b, d directly short circuited and includes stator windings 40, 41 and 43 which are similar to windings 20, 21 and 23 on machine E, as to location and function. However, winding 41 is not directly traversed by the regulator current produced by a regulator dynamo R, similar to dynamos M, N, having a shunt excitation winding 44 with a rheostat X7 in series therewith, the dynamo being coupled to machine G. Such regulator current is supplied to a control stator winding 46 of an amplifier metadyne S whose primary brushes a, c are short circuited. The amplifier metadyne S is also provided with a secondary compensating winding 47 in series with the output circuit of the secondary brushes b, d, which is connected to the stator winding 41 of machine G. The winding 47 provides a large amplification factor, as more completely described in British Patent 420,167.

With the use of amplifier metadyne S, a very close regulation of the speed of machine G may be obtained. It is understood that machines E, F may also be provided with amplifying means for their respective regulator currents.

The machines E, F and G may be used to drive generators to provide alternating current of constant frequency. However, such current may be directly derived from the machines with the elimination of the generator. Thus, in the case of machine G, a system of monophase or polyphase slip rings 45 are connected to the armature winding and brushes will supply alternating current of constant frequency at terminals T. The same can be done with machines E and F. With the elimination of separate generators, the machines E, F and G when used directly as generators, may be substantially reduced in size. In such case the machines are operative to convert direct current into alternating current.

In Fig. 2 is shown a generator W having a shaft Z which may be driven at a variable speed, embodying the invention and illustrating a modification thereof.

The generator W includes stator windings 50, 51, 55 and 56 having their magnetic axes coincident with the commutating axis of the secondary brushes b, d on the armature thereof, and stator windings 52, 53, 54 and 57 having their magnetic axes coincident with the commutating axis of the primary brushes a, c on the armature thereof.

The primary brushes a, c are essentially short circuited through the windings 54, 55 which are series connected and of low resistance. The winding 54 creates ampere turns having a direction which is coincident or in opposition to that of the armature primary ampere turns and sets the resultant armature ampere turns at a value best adapted to attain optimum efficiency in terms of the power of the machine.

The winding 55 creates ampere turns which induce an electromotive force between the primary brushes in opposition to the primary current. The winding 50 is energized by a suitable source of direct current with its ampere turns determined by rheostat X9, said winding determining the direction and intensity of the secondary current supplied by the generator to the output terminals O. Winding 51 compensates only partially the secondary armature ampere turns. Winding 52, which is energized by a suitable direct current source and has its ampere turns determined by rheostat X8, partially controls the intensity of the primary current.

Winding 53, which is shunt connected across the secondary brushes b, d, creates ampere turns inducing between the secondary brushes an electromotive force in the direction required by the load.

Winding 56, also shunt connected across the secondary brushes b, d, induces by its ampere turns an electromotive force between the primary brushes a, c in the direction required by the load. Winding 57, series connected to brush d, induces by its ampere turns an electromotive force between secondary brushes b, d, in opposition to the secondary current.

Assuming a clockwise wound armature and clockwise revolution of shaft Z, the direction of the ampere turns of winding 50 being predetermined as indicated by the arrow in the figure and the load being positive, then the remaining stator windings will have their respective ampere turns as indicated by the arrows in the figure. Windings 52 and 54, having no indicating arrows, may create ampere turns in either direction. It is noted that the ampere turns of winding 50 are in opposition to the secondary armature current.

The operation of generator W is quite similar to that of generators A, C described above, except that the primary current traversing brushes a, c and creating the primary flux, is not supplied by a battery as in Fig. 1, but is created by the E. M. F. induced between the primary brushes a, c due to the flux provided by the independently energized winding 50. It is clear that as the primary brushes a, c are essentially short circuited, a very small portion of the ampere turns created by winding 50 is sufficient to induce a large primary current and therefore, the ampere turns of winding 50 must be practically compensated by the ampere turns due to the secondary current traversing brushes b, d. For that reason, there is obtained a secondary output current which is constant and independent of the rotational speed of shaft Z and also independent of the voltage at said secondary brushes.

Under these conditions, the generator W supplies constant current practically independently of the speed of shaft Z and will supply the voltage required by the load whatever the same may be and under conditions of rapid variation therein. It is also noted that the operation of the generator is very stable.

It is understood that other generators similar to that shown in Fig. 2 may be operated in parallel relation to each other, with the respective shafts rotating at variable speed, independently of each other. Similarly, generators of the type shown in Fig. 1 may be operated in parallel with generator W.

It is understood that in lieu of the regulator dynamos shown and described, any other suitable means capable of providing a regulator current responsive to small variations in speed from a given speed of the regulated machine, may be used.

Since various changes may be made in the embodiments of the invention disclosed without departing from the spirit thereof, it is understood that the herein described embodiments shall be interpreted as illustrative and not in a limiting sense except as set forth in the claims following.

Having thus described my invention, I claim as new and desire to protect by Letters Patent:

1. A power system comprising a source of direct current, at least one variable speed electric generator operative to supply constant current independently of the speed thereof, at least one rotating electric machine rotating at constant speed independently of the load and energized by said generator, said generator including an armature having associated therewith a set of primary brushes and a set of secondary brushes, and a plurality of stator windings, a low resistance circuit interconnecting said primary brushes, said secondary brushes providing an input for said rotating electric machine, circuit means connecting said direct current source and one of said stator windings to create ampere turns in a direction opposite to that of the armature ampere turns due to the secondary current traversing said secondary brushes, circuit means connecting a second stator winding in the secondary brush circuit, said second winding being traversed by a brush current creating ampere turns inducing an electromotive force opposing said brush current, circuit means connecting a third stator winding in the secondary brush circuit, said third winding being traversed by a brush current creating ampere turns partially compensating the ampere turns due to said brush current traversing the armature, a fourth stator winding shunt connected across said secondary brushes and operative to create ampere turns inducing an electromotive force between said secondary brushes in a direction determined by the current traversing said electric machine, said rotating electric machine comprising an armature provided with a set of substantially short circuited brushes and a second set of brushes connected to the output of said generator, and a plurality of stator windings, speed regulating means comprising a dynamo electric machine coupled to said rotating electric machine and operative to provide a regulator current varying quickly with a slight deviation in the speed of said rotating electric machine from a predetermined speed, one of said last mentioned stator windings in circuit with said dynamo electric machine, a second of said last mentioned stator windings being operative to create ampere turns of arbitrary value and in an arbitrary direction along the direction of the armature ampere turns due to the current traversing said short circuited brushes, a third of said last mentioned stator windings being connected to one of said second set of brushes and traversed by the output current of said generator and creating ampere turns in a direction opposite to that created by the same current traversing the armature of said rotating electric machine.

2. A power system as in claim 1 wherein a plurality of said generators are arranged for parallel operation.

3. A power system as in claim 1 wherein a plurality of said rotating machines are series connected through the second set of brushes thereof.

4. A power system as in claim 1 wherein said generator further includes a stator winding traversed by a brush current and creating ampere turns in the same direction as the armature ampere turns due to said current traversing the generator armature.

5. A power system as in claim 1 wherein said rotating electric machine includes another stator winding traversed by brush current and creating ampere turns along the same direction as the armature ampere turns due to said current.

6. A power system as in claim 1 wherein said low resistance circuit includes a low resistance source of direct current.

7. A power system as in claim 1 wherein said one stator winding of said rotating electric machine is in circuit with the output of dynamo electric amplifying means coupled to said dynamo electric machine and the input of said amplifying means is in circuit with the output of said dynamo electric machine.

8. A power system as in claim 3 wherein each of said rotating machines includes slip rings associated with the armature thereof, the corresponding rings of said rotating machines being interconnected whereby to synchronize the speed of said rotating machines.

9. A power system as in claim 1 wherein said rotating electric machine includes slip rings associated with the armature thereof to provide an output of alternating current of constant frequency.

10. A power system as in claim 1, wherein said dynamo electric machine includes a shunt excitation winding and means for varying the resistance thereof.

References Cited in the file of this patent

UNITED STATES PATENTS 2,484,237     Minder               Oct. 11, 1949